(12) United States Patent
Ekström et al.

(10) Patent No.: US 9,169,541 B2
(45) Date of Patent: Oct. 27, 2015

(54) SANDWICH MATERIAL WITH HIGH STRENGTH AT HIGH TEMPERATURE FOR THIN STRIPS IN HEAT EXCHANGERS

(75) Inventors: Hans-Erik Ekström, Finspång (SE); Anders Oskarsson, Finspång (SE)

(73) Assignee: Gränges Sweden AB, Finspång (SE)

( * ) Notice: Subject to any disclaimer, the term of this patent is extended or adjusted under 35 U.S.C. 154(b) by 734 days.

(21) Appl. No.: 13/501,591

(22) PCT Filed: Oct. 12, 2010

(86) PCT No.: PCT/SE2010/051098
§ 371 (c)(1),
(2), (4) Date: Apr. 12, 2012

(87) PCT Pub. No.: WO2011/046499
PCT Pub. Date: Apr. 21, 2011

(65) Prior Publication Data
US 2012/0199634 A1    Aug. 9, 2012

(30) Foreign Application Priority Data
Oct. 13, 2009    (SE) ..................................... 0950756

(51) Int. Cl.
*C22F 1/04*    (2006.01)
*C22C 21/02*    (2006.01)
(Continued)

(52) U.S. Cl.
CPC .............. *C22C 21/02* (2013.01); *B23K 35/0238* (2013.01); *B23K 35/286* (2013.01);
(Continued)

(58) Field of Classification Search
CPC ........... C23C 21/02; C23C 21/04; C22F 1/04; C22F 1/043; B23K 35/0238; B23K 35/286

USPC .................................................. 228/158, 117
See application file for complete search history.

(56) References Cited

U.S. PATENT DOCUMENTS 6,316,126 B1    11/2001 Hasegawa et al.
6,451,453 B1    9/2002 Kucza et al.
(Continued)

FOREIGN PATENT DOCUMENTS

CN    1936060 A    3/2007
CN    101039802 A    9/2007
(Continued)

OTHER PUBLICATIONS

Notice of Reasons for Rejection—Aug. 25, 2014 (Issued in Counterpart Application No. 2012-534142) With Translation.
(Continued)

*Primary Examiner* — Lois Zheng
(74) *Attorney, Agent, or Firm* — Morgan, Lewis & Bockius LLP (57) ABSTRACT

The invention relates to a method for making a sandwich material for brazing, comprising the steps of:
providing a core layer of a first alloy that contains (by wt. %): 0.5-2.0% Mn, ≤1.0% Mg, ≤0.2% Si, ≤0.3% Ti, ≤0.3% Cr, ≤0.3% Zr, ≤0.2% Cu, ≤3% Zn, ≤0.2% In, ≤0.1% Sn and ≤0.7% (Fe+Ni), the rest Al and ≤0.05% of each of unavoidable impurities;
providing a barrier layer of a second alloy that contains (by wt. %): ≤0.2% Mn+Cr, ≤1.0% Mg, 1.6-5% Si, ≤0.3% Ti, ≤0.2% Zr, ≤0.2% Cu, ≤3% Zn, ≤0.2% In, ≤0.1% Sn and ≤1.5% (Fe+Ni), the rest Al and ≤0.05% of each of unavoidable impurities;
rolling the layers together so that they adhere and form a sandwich material;
heat treating the sandwich material at a predetermined temperature and for a predetermined time so that the Si-content is equalized to 0.4-1% in both core layer and barrier layer;
rolling the sandwich material to a final thickness.

14 Claims, 4 Drawing Sheets

(51) Int. Cl.
- *B23K 35/02* (2006.01)
- *B23K 35/28* (2006.01)
- *B32B 15/01* (2006.01)
- *C22C 21/00* (2006.01)
- *C22F 1/043* (2006.01)
- *F28F 21/08* (2006.01)

(52) U.S. Cl.
CPC ............... *B32B15/016* (2013.01); *C22C 21/00* (2013.01); *C22F 1/04* (2013.01); *C22F 1/043* (2013.01); *F28F 21/089* (2013.01)

(56) References Cited

U.S. PATENT DOCUMENTS

| | | | |
|---|---|---|---|
| 6,627,330 | B1 | 9/2003 | Shimizu et al. |
| 7,374,827 | B2 | 5/2008 | Kilmer |
| 7,749,613 | B2 | 7/2010 | Koshigoe et al. |
| 8,574,723 | B2 | 11/2013 | Ekstrŏm |
| 2005/0067066 | A1 | 3/2005 | Tanaka et al. |
| 2008/0274367 | A1 | 11/2008 | Kilmer et al. |

FOREIGN PATENT DOCUMENTS

| | | |
|---|---|---|
| CN | 101443188 A | 5/2009 |
| EP | 0 718 072 A1 | 6/1996 |
| EP | 1 075 935 A1 | 2/2001 |
| GB | 2 073 246 A | 10/1981 |
| GB | 2353750 A | 3/2001 |
| JP | H0436600 A | 2/1992 |
| JP | H059671 A | 1/1993 |
| JP | 11100628 A | 4/1999 |
| JP | 2000-190089 * | 7/2000 ............ B23K 35/22 |
| JP | 2000190089 A | 7/2000 |
| JP | 20011179 A | 1/2001 |
| JP | 2001340989 A | 12/2001 |
| JP | 2002066786 A | 3/2002 |
| JP | 2005224851 A | 8/2005 |
| JP | 2009161831 A | 7/2009 |
| JP | 2011520032 | 7/2011 |
| WO | WO-2005/021209 A1 | 3/2005 |
| WO | WO-2009/128766 A1 | 10/2009 |
| WO | WO-2011/034102 A1 | 3/2011 |

OTHER PUBLICATIONS

International Preliminary Report on Patentability, dated Feb. 2, 2012, issued in connection with counterpart International Application No. PCT/SE2010/051098.

International Search Report, dated Jun. 28, 2011, issued in connection with counterpart International Application No. PCT/SE2010/051098.

Written Opinion of the International Searching Authority for counterpart International Application No. PCT/SE2010/051098, Jun. 28, 2011.

Wittebrood, A., et al., "Liquid Film Migration in Aluminium Brazing Sheet?", Materials Science Forum, vols. 519-521, (2006), pp. 1151-1156.

International Alloy Designations and Chemical Composition Limits for Wrought Aluminum and Wrought Aluminum Alloys, Apr. 2006.

Chinese Office Action (With Translation)—Jun. 5, 2013—Issued in Counterpart Application No. 201080046345.0.

* cited by examiner

SANDWICH MATERIAL WITH HIGH STRENGTH AT HIGH TEMPERATURE FOR THIN STRIPS IN HEAT EXCHANGERS

CROSS-REFERENCE TO RELATED APPLICATIONS

This application claims priority under 35 U.S.C. §119 to Swedish patent application 0950756-7 filed 13 Oct. 2009 and is the national phase under 35 U.S.C. §371 of PCT/SE2010/051098 filed 12 Oct. 2010.

FIELD OF THE INVENTION

The present invention relates to a method of fabrication of a sandwich material intended for brazing, a process for fabricating a brazed product, and an application for a brazed product. The invention also relates to a sandwich material produced by the method and a brazed product produced by the process.

BACKGROUND OF THE INVENTION

Aluminium is an often used material for manufacture of products by brazing. Aluminium can be alloyed by adding various alloying elements, such as Mn, Mg, Ti, Si, and the strength of the aluminium alloy is affected by precipitation of particles or by the alloying materials forming a solid solution with aluminium.

Material for brazing of the above type can be given high strength after the brazing by cold working it prior to the brazing, that is, rolling or stretching at temperature below 200° C., which increases the strength, and doing this in a way so that it does not lose the strength increase upon brazing. This means that the material is prevented from recrystallising entirely during the heat treatment which brazing entails. Such a material, furthermore, can be given high resistance to fatigue and creep when used at high temperature, up to and including 300° C. This high strength at high temperature is created both by lowering the driving force for recrystallisation by selecting a sufficiently low degree of deformation during the cold working and by increasing the retarding force by creating a sufficiently large quantity of particles per unit of volume.

Material for brazing can be coated with a braze layer of an alloy with high silicon content. In brazing, such material is placed in contact with another part and heated in a brazing furnace. The high silicon content in the braze layer causes the braze layer to melt at lower temperature than the underlying core layer, flow away due to capillary forces and surface tension differences, and form brazed seams with the other part.

Another variant of brazing material does not have any braze layer, but it is brazed to a material with such a layer. For example, such material can be used in so-called fins in heat exchangers, such as automobile radiators that are folded from thin aluminium sheet. When fabricating the heat exchanger, the fins are placed against braze-clad tubes and then heated in a brazing furnace so that the braze layer on the tube melts and flows away due to capillary forces and surface tension differences and forms brazed joints between the fins and the tube.

The primary function of the fins in a gas/liquid heat exchanger, such as an automobile radiator, is to conduct the heat from the liquid in the tube to the gas. The fins often have additional tasks. The brazing is done at very high temperature, so that the material can be creep-deformed only by the mechanical stress caused by its own weight. The fins must not become so soft that they collapse, but rather help to maintain the form of the heat exchanger. The capacity of the fins in this regard, their "sagging resistance", is measured by fastening strips of a certain length, such as 50 mm, horizontally at one end in a furnace that is heated up to 600° C. The sagging of the free end is measured when the furnace has cooled down. It is also important to the ability of the heat exchanger to resist the high pressure which can occur in the tube during operation that the fins help out in resisting this high pressure. If the fins have good strength also at high temperature, the tube can be thinner, which means that the heat exchanger weighs less.

If the material of parts being brazed is not recrystallized when heated to the brazing temperature before the melting temperature of the braze is reached, silicon from the braze will penetrate the material being brazed. This entails a risk, in thin sheet such as fins, of melting and collapsing or, alternatively, of forming incomplete or poorly brazed seams with large pores. The penetration of the silicon occurs by diffusion, melting of the outer layer, or so-called "liquid film migration" [see, e.g., A. Wittebrod, S. Desikan, R. Boom, L. Katgerman, Materials Science Forum Vols. 519-521, (2006) pp. 1151-1156)].

Therefore, a brazing material per the above that does not recrystallize during brazing must have a barrier layer. A suitable name for a material consisting of several layers is sandwich material. The function of the barrier layer is to reduce the penetration of silicon from the braze material into the underlying core material during the brazing and thereby assure the formation of good brazed joints, so that the core material does not begin to melt. Silicon penetration occurs especially easy at grain boundaries. Therefore, large grains need to be formed in the barrier layer so that there are few grain boundaries.

One problem with ordinary high-strength brazing material, such as that with high contents of manganese, is that its corrosion properties are not the best. Intermetallic particles with iron, manganese, and aluminium are more noble than the surrounding aluminium matrix, which gives rise to pitting in moist settings. Commercially pure aluminium having only iron and silicon as alloying material and also low iron content has much better properties in this regard. Barrier layer and core layer can therefore advisedly be constituted such that the sandwich material has good corrosion properties.

If the tubes in air/water heat exchangers become corroded, they will leak, which must be prevented. Therefore, zinc is often added to the alloy in the fins so that they have lower electrical potential in relation to the tube and provide so-called cathodic protection. Of course, this results in greater overall corrosion on the fins. But this may be acceptable, whereas intergranular corrosion and pitting which leads to a faster dissolving of the fins must not occur. One way of further improving the corrosion properties is to increase the electrochemical potential of the core layer. This can be done, for example, by using copper, manganese or some other alloying material that increases the electrochemical potential in solid solution and that is placed in solid solution by the brazing process.

One problem with known types of brazing material is that they lack sufficient fatigue strength and creep resistance at high temperatures. If the temperature is high during the testing, over 200° C., and the material is subjected to high stress also the lifetime for fatigue stressing of the material's creep resistance will be limited. Since the intermetallic precipitations contribute greatly to the strength at high temperatures, it is important for them to be stable and not dissolve too fast over time. This is especially important for a core material that is not recrystallized, since the precipitates retard the course of recrystallisation.

Two examples of products that need better fatigue strength and creep resistance at temperatures over 150° C. and up to 300° C. are intercoolers and exhaust gas coolers for recycling in automobile engines. These products are usually fabricated by brazing of sandwich material. Increased demands on automobile engines for reduced emissions of polluting gases and improved efficiency means that these coolers are subjected to increasingly higher operating temperatures and gas pressures. This causes a problem, since existing sandwich material does not meet the strength requirements. Ordinary automobile radiators that do not reach operating temperature higher than 100° C. are today made in relatively heavy material dimensions for strength reasons. The heavy weight contributes to high fuel consumption. The large quantity of material used in radiators also makes them costly to manufacture. Even though the fins are thin as compared to tubes and other parts in an automobile radiator, they still amount to a large part of the radiator's weight, perhaps 40%, and it is therefore very important for them to have good strength at the operating temperature so that their thickness can be reduced.

The above problem has been solved for tubes and end plates of heat exchangers by the method specified in WO 2009/128766. In this method, the core layer has a composition such that it does not recrystallize during brazing. To prevent silicon from the braze penetrating into the core layer, a barrier layer is applied by rolling, consisting of an aluminium alloy that recrystallizes in large grains during brazing. One problem is that it can be hard to get the barrier layer to adhere to the core layer during hot rolling if there is a large difference in deformation resistance between core layer and barrier layer and if the barrier layer is very thick. An oxide-free aluminium surface is very quickly covered by oxide when it makes contact with air. To get adhesion, a metal surface without oxide needs to be created both on core layer and barrier layer so that one gets a metal against metal contact. This is achieved by the surface enlargement produced by rolling if both layers are deformed. For example, if the core layer is much harder than the barrier layer, then the core layer will not be deformed.

In the fabrication process, plates of the barrier layer are placed on one or both sides of an ingot of the core alloy. For good yield in the industrial rolling process, the combined thickness of this sandwich pack is 60 cm thick. It is then necessary to start the rolling with relatively small reductions in each rolling pass. Since the ratio between the diameter of the working rolls and the thickness of the sandwich pack is small, this means that the primary thickness reduction and thus the surface enlargement occurs near the surfaces of the sandwich pack. If the barrier layer is thick, the surface enlargement is small in the boundary layer between barrier layer and core ingot and it is hard to make the layers stick together. An even greater problem is that most of the thickness reduction occurs at the surface, so the barrier layer is lengthened more than the core layer. This squeezes the barrier layer out both to the front and rear of the core layer. These projecting parts must then be trimmed off, which lowers the efficiency of the process. Furthermore, the barrier layer is forced out to the sides beyond the core layer, which means one gets a variation in thickness of the barrier layer over the width of the finished sheet. The edges of the rolled sheet must therefore be sheared off and scrapped, since their thickness is too thin at the barrier layer. This further decreases the yield of the process. Of course, if the barrier layer is softer than the core layer, which is often the case, the problem of poor yield is further accentuated. This problem becomes even more severe in very thin sheet, such as heat exchanger fins, which are often thinner than 0.1 mm and can be as thin as 0.05 mm. This means that for the barrier layer to work, which requires a thickness of at least 0.007 mm, it will take up a sizeable part of the thickness. It is then hard for the customary method of fabricating thin sheets for heat exchangers—hot rolling—to have a good yield, especially if the core layer is much harder than the barrier layer. If the barrier layer is thicker than 20% of the total thickness, it is hard to make the layers stick together at all during the rolling.

What primarily makes a material hard during rolling is its content of many hard intermetallic particles. Alloy elements in solid solution also increase the resistance to deformation. In a sandwich material, the core layer should have many particles so as not to recrystallize, while the barrier layer should have few particles, so as to recrystallize in a large grain size at a relatively low temperature. Thus, the hardness difference between the layers can be large when they are rolled together, and this must be avoided in order to get a good yield.

SUMMARY OF THE INVENTION

One primary goal of the present invention is to provide a sandwich material for brazing that can be made with high yield and has high strength both at low and high temperature, especially for creep and fatigue. This goal is achieved by a method for making a sandwich material for brazing.

A further goal of the invention is to provide a sandwich material having good corrosion properties, in addition to the aforementioned high strength. This is achieved according to the invention in that the electrochemical potential is decreased toward the surface and in that the surfaces exposed to the outside, the so-called barrier layer, in a brazed heat exchanger have few intermetallic particles.

The invention also involves a method for making a sandwich material for brazing that provides good yield in the rolling process and high strength for the sandwich material both at low and high temperature. This is possible in that thinner material can be used, which means material savings and, moreover, in heat exchangers for vehicles, a lower weight and thus reduced fuel consumption.

A further goal of the present invention is to provide a brazed product consisting of a sandwich material having high strength both at low and high temperature. This goal is achieved by a process for production of a brazed product.

The invention also calls for application of a brazed product made according to the aforementioned process at operating temperatures over 150° C., preferably over 200° C., and most preferably over 250° C.

A brazed product made according to the above described process can also preferably be used at lower operating temperatures, such as up to 100° C., where thinner material than normal can be used to save on material input or weight and fuel consumption.

The invention provides a sandwich material for brazing, comprising a core layer of a first aluminium alloy and a barrier layer of a second aluminium alloy, where the barrier layer and the core layer have essentially the same deformation resistance before being rolled together, and the sandwich material can be produced by the steps of providing a core layer of a first alloy that contains (by wt. %): 0.5-2.0%, preferably 0.8-1.8%, most preferably 1.0-1.7% Mn, ≤0.2% preferably ≤0.1% Si, ≤0.3% Ti, ≤0.3%, preferably ≤0.2% Cr, ≤0.3%, preferably ≤0.2% Zr, ≤0.2%, preferably ≤0.1% Cu, ≤3% Zn, ≤0.2% In, ≤0.1% Sn and ≤0.7%, preferably ≤0.35%, (Fe+Ni), ≤1.0%, but for brazing under inert gas with flux ≤0.3%, most preferably ≤0.05% Mg, the rest Al and ≤0.05% of each of unavoidable impurities;

providing a barrier layer of a second alloy that contains (by wt. %): ≤0.2% Mn+Cr, 1.6-5%, preferably 2-4.5% Si, ≤0.3%, preferably <0.2% Ti, ≤0.2% Zr, ≤0.2%, preferably ≤0.1% Cu, ≤3% Zn, ≤0.2% In, ≤0.1% Sn and ≤1.5%, preferably ≤0.7%, most preferably 0.1-0.35% (Fe+Ni), ≤1.0%, but for brazing under inert gas with flux ≤0.3%, most preferably ≤0.05% Mg, the rest Al and ≤0.05% of each of unavoidable impurities;

rolling the layers together so that they adhere and form a sandwich material;

heat treating the sandwich material at a predetermined temperature and for a predetermined time so that the Si-content is equalised to 0.4-1% in both core layer and barrier layer;

rolling the sandwich material to a final thickness.

The core layer has a high content of manganese, which means it has a high deformation resistance, but since it has a low content of silicon the number of dispersoids is lower and thus the deformation resistance in hot rolling is lower than if the silicon content were high. The barrier layer has a high content of silicon, which means that its deformation resistance is higher than for low silicon content and the deformation resistance for core and barrier layers will thus differ to a lesser degree, which substantially increases the yield and facilitates the adhesion when rolled together. The magnesium content of the core layer will be lower than in the barrier layer so as to further decrease the difference in deformation resistance.

In a first step, the core layer is rolled together with the barrier layer on one side or both sides to form a sandwich material. This is advisedly done by hot rolling. The sandwich material can then be cold rolled. The degree of cold rolling is determined by the final thickness of the sandwich material and the desired material properties. Advisedly, the sandwich material is rolled until it is between 8% and 33% thicker than the final thickness, advisedly between 8% and 28% thicker than the final thickness, even better between 8% and 16% thicker than the final thickness for best results.

The sandwich material is then heat treated at temperatures between 350° C. and 500° C. and long enough so that it recrystallizes and silicon from the barrier layer diffuses into the core layer. This heat treatment is called hereinafter the "intermediate annealing". The manganese in the core layer separates out to a high degree in small recrystallisation-inhibiting Al—Si—Mn-precipitates, so-called dispersoids. The silicon content after intermediate annealing should be at a level in the range of 0.4-1% in both core layer and barrier layer. The time for the intermediate annealing depends on the material's dimensions and the intermediate annealing temperature and it is advisedly 1 to 24 hours. By holding the silicon content below 1%, the layer is prevented from melting and the minimum content of 0.4% means that thanks to the dispersoid formation the core layer does not recrystallize entirely during the brazing of the finished material, which is most often done at a temperature of 590-610° C. After the aforementioned intermediate annealing, the sandwich material is worked to its final thickness by cold rolling. The degree of final working depends on the desired material properties in the finished product and how much the sandwich material was worked in previous stages. Advisedly, the cold rolling is done with a degree of reduction that is 8%-33%, preferably 8%-28%, most preferably 8%-16%, of the final thickness.

Since the core layer before the rolling contains a low content of silicon and the barrier layer a high content of silicon, the difference in deformation resistance during the rolling is not so great, which means that the rolling yield will be good. When the intermediate annealing is then carried out, a dense quantity of dispersoids will have formed in the core layer to give the desired recrystallisation-inhibiting effect during the brazing. If silicon is present in high content in the core layer, a dense quantity of dispersoids will be formed, giving a high deformation resistance. The recrystallisation-inhibiting effect of the dispersoids can still be obtained if the dispersoids are formed later in the process during the aforementioned intermediate annealing.

The barrier layer recrystallizes even if the layer is thin, since the low manganese, zirconium, and chromium contents mean that much fewer dispersoids are formed in the barrier layer. The desired coarse grain size in the barrier layer is achieved by holding the contents of iron and nickel at a low level. Such a material is especially suitable for brazing to a surface that is coated with braze. Thus, advisedly, there is no other layer of any kind on the side of the barrier layer that is facing away from the core layer.

Since the deformation resistance of core and barrier layers does not differ significantly, the rolling yield is very good. The above sandwich material provides several advantages after the aforementioned rolling and intermediate annealing; the barrier layer recrystallizes in a coarse grain size upon being heated to the brazing temperature, whereupon diffusion of silicon from the braze to the core is substantially reduced. The carefully attuned alloy contents in core layer and barrier layer help give the sandwich material good strength properties at high temperatures after the brazing by counteracting recrystallisation of the core layer. The material therefore has high fatigue strength and good creep strength at temperatures up to 300° C. After brazing, the sandwich material has very good brazed seams.

The sandwich material can consist of a core layer of a first aluminium alloy and a barrier layer of a second aluminium alloy that is arranged on one side of the core layer.

The sandwich material can consist of a core layer of a first aluminium alloy and two barrier layers of a second aluminium alloy arranged on either side of the core material.

Advisedly the barrier layer constitutes the outermost layer of the sandwich material on the side of the sandwich material that is to be brazed to another part. Such a material is very suitable in thin sheet, for use as fins in heat exchangers.

Advisedly the barrier layer after heating to the brazing temperature has a recrystallized structure with a grain size greater than 50 μm parallel to the rolling surface, which minimises penetration of silicon from braze to the core, which in turn contributes to a stronger brazed seam.

The core layer can have a non-recrystallized or partly recrystallized structure after brazing. This structure of the core layer is essential to provide high strength to the sandwich material.

Advisedly the sandwich material after brazing has a fatigue strength greater than 35 MPa at 1 million loading cycles with a tensile load of R=0.1 at 300° C.

Advisedly the sandwich material meets the following conditions: $0.4\% \leq Cs \cdot x/100 + Ck \cdot (100-x)/100 \leq 1.0\%$, where the silicon content in the core layer is Ck % and in the barrier layer Cs % before the rolling and the thickness of the barrier layer (or the combined thickness in the case of two barrier layers) is x % of the total thickness of the sandwich material after the rolling. If the conditions are fulfilled, one will achieve the desired recrystallisation-inhibiting effect in the core layer and prevent the layer from melting during the brazing.

The invention relates to a method for making a sandwich material for brazing, comprising the steps of:
- providing a core layer of a first alloy that contains (by wt. %): 0.5-2.0%, preferably 0.8-1.8%, most preferably 1.0-1.7% Mn, ≤0.2% preferably ≤0.1% Si, ≤0.3% Ti, ≤0.3%, preferably ≤0.2% Cr, ≤0.3%, preferably ≤0.2% Zr, ≤0.2%, preferably ≤0.1% Cu, ≤3% Zn, 0.2% In, ≤0.1% Sn and ≤0.7%, preferably ≤0.35%, (Fe+Ni), ≤1.0%, but for brazing under inert gas with flux ≤0.3%, most preferably ≤0.05% Mg, the rest Al and ≤0.05% of each of unavoidable impurities;
- providing a barrier layer constituting a second alloy that contains (by wt. %): ≤0.2% Mn+Cr, 1.6-5%, preferably 2-4.5% Si, ≤0.3%, preferably <0.2% Ti, ≤0.2% Zr, ≤0.2%, preferably ≤0.1% Cu, ≤3% Zn, ≤0.2% In, ≤0.1% Sn and ≤1.5%, preferably ≤0.7%, most preferably 0.1-0.35% (Fe+Ni), ≤1.0%, but for brazing under inert gas with flux ≤0.3%, most preferably ≤0.05% Mg, the rest Al and ≤0.05% of each of unavoidable impurities;
- rolling the layers together so that they adhere and form a sandwich material;
- heat treating of the sandwich material at a predetermined temperature and for a predetermined time so that the Si-content is equalised to 0.4-1% in both core layer and barrier layer;
- rolling the sandwich material to a final thickness.

The sandwich material can be rolled into sheet or plates of various lengths with low variation in thickness over the surface of the sheet. Since the difference in deformation resistance between core layer and barrier layer is slight, the method consequently enables a safe and rational manufacture of a sandwich material with high productivity and high yield.

Before the hot rolling, yet another layer of the second aluminium alloy can be arranged at another surface of the core layer so that the core layer is enclosed by a barrier layer on both sides. This creates a sandwich material that can be brazed on both sides.

Further layers of an aluminium alloy that has special corrosion-protecting properties can be arranged on another surface of the core layer so that the core layer is enclosed by a barrier layer on one side and a corrosion-protecting layer on another side.

The rolling together of the layers is advisedly done by hot rolling at 350° C.-500° C.

The sandwich material is then cold rolled. The degree of cold rolling is chosen based on the desired final thickness and desired properties in the finished product. Advisedly, the sandwich material is rolled until it is between 8% and 33% thicker than the final thickness, advisedly between 8% and 28% thicker than the final thickness, especially between 8% and 16% thicker than the final thickness for best results.

In a further step, the rolled sandwich material is heat treated at high temperature, 300-500° C. The temperature is advisedly 350-500° C. and the time during which the material is heated depends on the material's dimensions and the particular temperature. Advisedly, the material is heated for a time between 1 and 24 hours. Thanks to the heat treatment, the so-called intermediate annealing, the internal structure of the sandwich material is changed so that the entire layer becomes recrystallized, diffusion of silicon from the barrier layer to the core layer results in manganese separating our in the form of numerous Al—Mn—Si precipitates, and the silicon content in the barrier layer is reduced to 1% or lower.

The sandwich material finally undergoes further cold working, usually by cold rolling, to final thickness. The degree of final working depends on the desired material properties of the finished product and how much the sandwich material has been worked in previous steps. Advisedly, the sandwich material is worked to final thickness with a reduction degree of 8% to 33%, preferably 8% to 28%, most preferably 8% to 16%, of the final thickness. During the cold working, the internal structure of the material is altered and its strength increases. This strength increase partly remains with the material in a brazed heat exchanger, since the core layer does not recrystallize fully during the brazing. This is because the driving force for the recrystallisation is low on account of the low reduction degree for the cold working after the intermediate annealing and because the retarding force for recrystallisation is high due to the numerous Al—Mn—Si precipitates. The low reduction degree of the cold working also lets the grain size in the barrier layer become large when this recrystallizes upon heating to the brazing temperature. This hinders the penetration of silicon from the braze and the melting of barrier layer and core layer.

A barrier layer that is 7 μm thick or more provides excellent resistance to penetration of silicon from the braze material if the heating rate during the brazing is at least 25° C./min.

The invention also relates to a process for fabrication of a brazed product comprising the above-described sandwich material, where the barrier layer has a recrystallized structure with grain size having a length parallel to the rolling surface that is at least 50 μm. The recrystallized, coarse grain structure in the barrier layer created during the heating to the brazing temperature contributes to less diffusion of silicon from the braze to the core, which produces a stronger brazed seam and lessens the risk of partial melting of barrier and core layers in the sandwich material during the brazing. Because the core layer does not recrystallize altogether and contains numerous precipitates, a brazed product is obtained where the sandwich material contributes high strength and very good creep and fatigue properties, especially at high temperatures up to and including 300° C. The sandwich material in the brazed product has a core layer with a deformed, non-recrystallized or partly recrystallized structure, where the sandwich material has a yield strength $R_{p0.2}$ of at least 60 MPa at room temperature. The sandwich material in this product has good corrosion resistance in that the sandwich material has a core layer which is more noble than the barrier layer and a barrier layer that contains few intermetallic particles.

The brazed product is suitably a heat exchanger.

The invention also relates to an application of the brazed product at operating temperatures reaching to over 150° C., or over 200° C., or over 250° C. The product is especially suitable for such an application, since it has very good strength properties at high temperatures.

The brazed product is also especially suitable in heat exchangers with operating temperatures under 100° C., since the high strength which the material has at these temperatures means that the material in the product can be thinner, which results in a cheaper product with low weight. The low weight is especially advantageous in the case when the product is used in motor vehicles, since the vehicle's fuel consumption is then reduced.

DETAILED SPECIFICATION OF THE INVENTION

The inventors have found a method of making a sandwich material for thin sheet for brazing of heat exchangers that has very high strength as compared to existing materials, even at high temperature, very good corrosion properties, and can be made with high productivity and high yield.

Since the barrier layer in thin sheets, such as the fin sheets in heat exchangers, needs to be thick, at least around 7 μm, to provide the desired protection function and therefore it takes up a sizeable portion of the thickness of the sandwich material, the problem of poor yield in the rolling process is especially severe in this case. But the required thickness depends on the temperature/time cycle during the brazing. A long time at high temperature requires a thicker barrier layer.

Experiments with rolling of layers of different hardness have shown that the hot rolling yield is considerably improved if the hardness of the layers during hot rolling in the temperature range of 350-500° C. does not differ too much.

Adhesion between the layers during hot rolling is significantly facilitated if the maximum deformation resistance of the barrier layer during hot rolling in the temperature range of 350-500° C. does not differ too much from the core material's maximum deformation resistance. An oxide-free aluminium surface is coated very quickly with oxide when it makes contact with air. Therefore, to achieve adherence, metal surfaces without oxide need to be created both on core layer and barrier layer during the rolling, so that metal to metal contact is achieved between the layers during the rolling. If barrier layer and core layer have approximately the same deformation resistance, their surfaces will be expanded at roughly the same pace during the rolling. This guarantees metal contact between the surfaces at all times and achieves good adhesion between them.

The barrier layer could be made hard by solution hardening if it is possible to use higher contents of alloying materials that can be maintained in solution, such as magnesium or copper. In certain brazing methods, such as inert gas brazing with flux, one cannot achieve good brazing properties if the magnesium content is too high. A high copper content cannot be used in fin sheet that is being brazed to tubes, since it produces a high electrical potential which leads to increased corrosion of the tubes. Another way would be to add alloying substances that form particles. This is less preferred, because the barrier layer is supposed to recrystallize in coarse grains when heated to the brazing temperature before the diffusion rate of silicon becomes high, even though it is thin and the driving force of recrystallisation is low.

Thus, one problem is to find a composition for the barrier layer that provides a sufficiently high deformation resistance during hot rolling and also results in a material that recrystallizes in a coarse grain size when heated to the brazing temperature. Experiments have shown that it is harder to stop silicon from the braze getting into the core material the finer the grain size in the barrier layer and the thinner the barrier layer. Thus, the choice of alloying materials in the barrier layer is very limited in terms of rolling capacity and recrystallisation properties. The thickness needed for the barrier layer to recrystallize and afford the necessary protection against silicon penetration depends on the rate of heating during the brazing.

In the present invention the silicon content of the barrier layer is high during the rolling process, which produces many particles and much silicon in solution, which gives high deformation resistance. The silicon content in the core alloy is low during the rolling process, which gives fewer particles and thus lower deformation resistance. The barrier layer should recrystallize prior to hot rolling when heated td the brazing temperature. The minimum thickness of the barrier layer is chosen based on its desired function and the rate of heating during the brazing. The high density of particles required in the core layer so that it does not recrystallize during the brazing is brought about during the aforementioned intermediate annealing prior to the final rolling. During this annealing, the silicon content of the barrier layer is reduced, which means that it does not melt during the brazing and also that the corrosion properties are substantially improved in that the alloy composition becomes more like pure aluminium.

In the sandwich material according to the invention, the core alloy after intermediate annealing before rolling to the final dimension has a large quantity of particles per volume unit to provide a large retarding force against recrystallisation and a very high resistance to fatigue and creep at high temperature.

As is seen, it is important to accurately select the alloying material and balance the alloying content in core layer and barrier layer so as to obtain a sandwich material that has good strength properties at high temperatures and can be worked by rolling with high productivity and good yield. What follows is a description of the effect of individual alloying elements in the sandwich material.

Silicon makes a contribution to the deformation resistance, especially at high deformation rates. The silicon content of the core layer prior to the intermediate annealing, which is supposed to even out the silicon content between core and barrier layers, should be ≤0.2; preferably ≤0.1 wt. percent. In the barrier layer, the silicon content should be high, so as to give a deformation resistance during hot rolling equal to the deformation resistance in the core layer and contribute to separation of manganese in numerous particles in the core layer during intermediate annealing before rolling to the final thickness. But the silicon content should not be so high that core layer and barrier layer melt during brazing. Preferably, the silicon content in the barrier layer before the heat treatment designed to even out the silicon content between core and barrier layer should be 1.6-5.0 wt. percent. Advisedly, the silicon content is 2.0-4.5 wt. percent in the barrier layer.

Magnesium increases the material's strength by solution hardening if it is present in solid solution or by forming $Mg_2Si$ precipitates upon ageing. Magnesium moreover increases the deformation resistance during rolling at high temperature, which means it can be used advantageously in the barrier layer. If its content is too high, the ability to braze is reduced on account of formation of a thick magnesium oxide layer on the surface and moreover there is a risk of melting of the material at the brazing temperature, which causes the magnesium content of the core layer to be limited to 1.0 wt. percent. During inert gas brazing with flux, magnesium reacts with the flux, which reduces the ability to braze. The ability to braze is reduced with increasing magnesium content. Magnesium in the core layer diffuses out into the barrier layer upon heat treatment and brazing. The magnesium content in the core layer is therefore limited to 0.3 wt. percent, preferably 0.05 wt. percent, if the material is to be used for inert gas brazing with flux.

In the barrier layer, for the same reason as in the core layer, the magnesium content is generally limited to 1.0 wt. percent. In the most common brazing method at present—inert gas brazing with flux—the barrier layer should not have higher content of magnesium than around 0.3 wt. percent, since magnesium has a negative effect on the function of the flux. The magnesium content in the barrier layer should therefore be ≤0.3 wt. percent, preferably ≤0.05 wt. percent, if the material is to be used for inert gas brazing with flux. Higher contents of magnesium than 0.3 wt. percent can be tolerated if the material is to be vacuum brazed.

Zinc is used to lower the electrical potential of the material and it is very often used to provide cathodic protection for the tubes in the heat exchanger. Up to 3% Zn can be used in the core and barrier layers.

Zirconium increases the deflection resistance and provides increased resistance to recrystallisation. Up to 0.3 wt. percent of zirconium can be added to the core layer's composition. Zirconium is distributed primarily as small $Al_3Zr$ particles, which particles will prevent recrystallisation and produce large grains in the material after brazing. Since the $Al_3Zr$ particles are stable even at very high temperatures, over 300° C., they increase the fatigue and creep strength at high temperatures. Above 0.3 wt. percent, coarse precipitates are formed, which negatively impact the formability of the material. Preferably, the Zr content in the core layer is limited to 0.2 wt. percent. Since Zr helps increase deformation resistance, the choice of Zr-content in the core layer is a compromise between the negative effect of increased deformation resistance during the rolling and the positive effects of increased recrystallisation inhibiting during brazing and increased strength in the brazed product. In the barrier layer, the zirconium content should not exceed 0.2 wt. percent, since it cannot be higher than what allows the barrier layer to recrystallize during brazing and provides the desired protection against silicon intrusion.

Titanium increases the strength and can be present in up to 0.3 wt. percent in the core layer. In the barrier layer, titanium can be present in up to 0.3 wt. percent, preferably <0.2 wt. percent. Since titanium in these contents does not form precipitates which can retard the recrystallisation, it can be used to increase the deformation resistance of the barrier layer during rolling at high temperature.

Manganese in solid solution increases the strength, deflection resistance, and corrosion hardness. Manganese in precipitates increases the strength. Manganese with suitable heat treatment at temperatures under 500° C. forms small particles, so-called dispersoids, with means diameter of less than 0.5 μm, which increase deflection resistance, inhibits recrystallisation during brazing, and increases the strength at low and high temperature. The manganese content in the core layer should be 0.5-2.0%, preferably 0.8-1.8%, most preferably 1.0-1.7%. In the barrier layer, the manganese+chromium content should not exceed 0.2 wt. percent, since the barrier layer must recrystallize at the brazing temperature.

Iron and nickel have a negative effect on corrosion resistance and to an even higher degree on resistance to deflection, intrusion of silicon from the braze material, and recrystallisation of the core layer. This is because iron and nickel form coarse precipitates which serve as nuclei for recrystallisation, which makes the grain size smaller. In the core layer, the Fe+Ni content should therefore be limited to 0.7 wt. percent, preferably to 0.35 wt. percent in the core layer. In the barrier layer, the content is limited to 1.5 wt. percent but should advantageously be under 0.7 wt. percent. Advisedly, the content is 0.10-0.35 wt. percent in the barrier layer.

Copper in higher content than 0.2 wt. percent has the disadvantage that the barrier layer can become more noble that tubes and other critical parts of the heat exchanger, which from a corrosion standpoint causes an unwanted electrical potential gradient. Therefore, the copper content in the core and barrier layer should not exceed 0.2 wt. percent, preferably not exceed 0.1 wt. percent.

Chromium, like zirconium and manganese, is a so-called dispersoid former at low contents. Since coarse particles are formed at higher chromium contents, the chromium content in the core layer should not exceed 0.3 wt. percent. In the barrier layer, the sum of the manganese and chromium contents should not exceed 0.2 wt. percent, since the barrier layer has to recrystallize at the brazing temperature.

Indium and tin are sometimes added in small amounts to change the material's electrochemical nature. The contents should be limited to ≤0.2% for indium and ≤0.1% for tin.

LIST OF FIGURES

FIG. 4 shows a picture of the sandwich material of the invention, taken in a scanning electron microscope in so-called "back scatter mode". The picture shows the grain structure in a longitudinal section after a braze-simulating heat treatment. The sandwich material consisted of core alloy 1 with 10% of the thickness of barrier layer 2 on each side. It was rolled with a reduction corresponding to 16% of the starting thickness between intermediate annealing and brazing. As the figure shows, the core alloy has a deformed structure, while the barrier layer has recrystallized in a coarse grain size.

EXAMPLES

The following examples describe the results of experiments carried out with sandwich material according to the invention as compared to standard material.

Example 1

Figure 1:
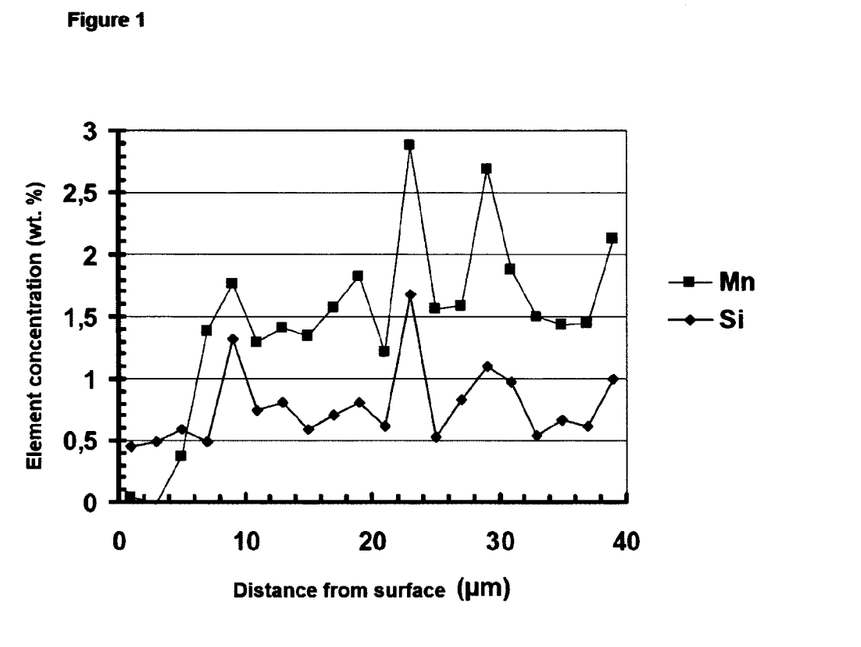
FIG. 1 shows the silicon and manganese content as a function of the depth from the plate's surface to its middle in a sandwich material according to the invention with core alloy 1 and barrier layer alloy 2 per Example 1 after intermediate annealing and rolling to 0.07 mm. The silicon and manganese concentration were measured by energy-dispersive spectroscopy in a scanning electron microscope, pointwise at various depths in a longitudinal section of the sandwich plate. The large variation in composition from one point to another is because the silicon in the core layer is for the most part in precipitates.

Sandwich material according to the invention was made by joining together plates of barrier layer alloys and plates of core layer alloys by rolling. The composition of the various layers is shown in Table 1. The core layer was provided with plates of the barrier layer on each side, where the barrier layer on each side constituted 10%, 15% or 20% of the total thickness. The layer was first heated to 480° C. for 2 hours. The rolling was done with no adhesion problems. The variation in thickness over the surface of the plates was less than 1%. The sandwich material was then rolled until the thickness was 0.09 mm. The sandwich plates were soft-annealed so that they recrystallized entirely and the silicon content was the same on average in both core and barrier layer, see FIG. 1. After this, the sandwich material was rolled with various thickness reductions from 5% up to 25% of the starting thickness.

TABLE 1

Alloy composition

|  | Si | Fe | Mn | Other |
|---|---|---|---|---|
| Core alloy 1 | 0.09 | 0.15 | 1.6 | <0.01 |
| Core alloy 2 | 0.08 | 0.16 | 1.1 | <0.01 |
| Core alloy 3 | 0.09 | 0.15 | 0.6 | <0.01 |
| Barrier layer 1 | 2.0 | 0.17 | <0.01 | <0.01 |
| Barrier layer 2 | 4.2 | 0.17 | <0.01 | <0.01 |

Figure 4:
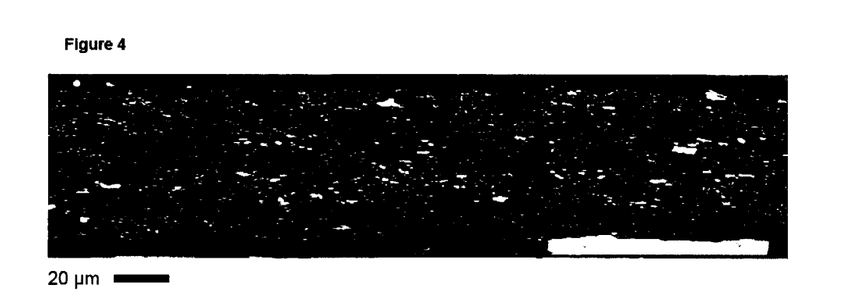

A piece of the sandwich material was suspended vertically in a furnace with nitrogen gas atmosphere and subjected to a heat treatment similar to that used for brazing automobile radiators: heating from room temperature to 600° C. for 20 min, then a holding time for 3 min at this temperature, followed by rapid cooling to room temperature. The barrier layer recrystallized in all instances in a grain size that was larger than 50 μm before reaching a temperature of 550° C. See an example in FIG. 4.

The strength of the sandwich material depends on the degree of reduction before the brazing simulation. Table 2 gives some examples.

TABLE 2

Yield strength, $R_{P0.2}$, for a 0.06-0.085 mm thick sandwich material after simulated brazing. The roll reduction is indicated in % of the thickness before the rolling.

|  | Roll reduction before brazing (%) | $R_{P0.2}$ (MPa) |
|---|---|---|
| Core 1 + 20% of barrier layer 1 | 7 | 40 |
|  | 12 | 50 |
|  | 17 | 62 |
|  | 25 | 38 |
| Core 1 + 10% of barrier layer 2 | 5 | 42 |
|  | 10 | 54 |
|  | 18 | 71 |
|  | 25 | 40 |
| Core 2 + 10% of barrier layer 2 | 6 | 42 |
|  | 11 | 55 |
|  | 16 | 73 |
|  | 24 | 35 |
| Core 3 + 10% of barrier layer 2 | 5 | 48 |
|  | 10 | 58 |
|  | 16 | 63 |
|  | 20 | 42 |
|  | 25 | 35 |

Figure 2:
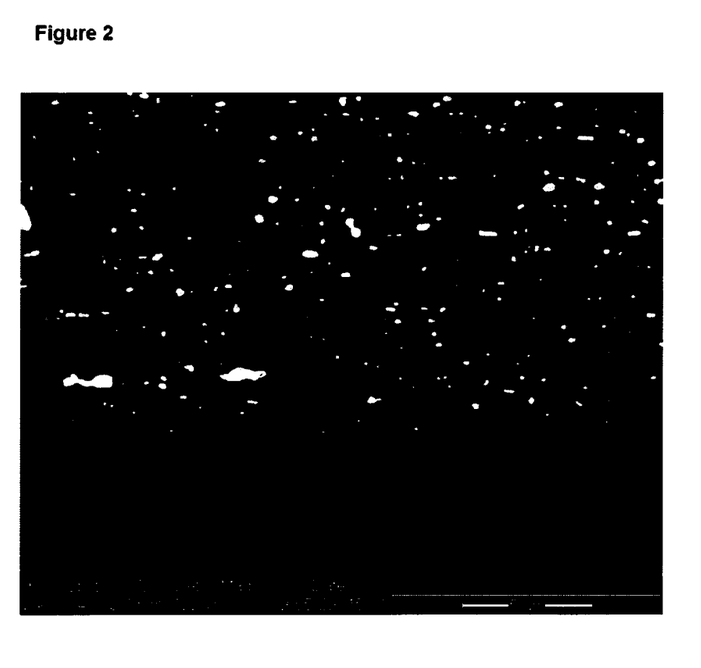
FIG. 2 shows the microstructure in longitudinal section after a braze-simulating heat treatment in the boundary zone between the barrier layer (lower part) and the core layer in the sandwich material according to the invention with core alloy 1 and barrier layer alloy 2 in Example 1.

The yield strength, $R_{p0.2}$, for certain combinations after the brazing simulation, is as high as 60-70 MPa at room temperature, which should be compared with 40 MPa for standard alloys for inert gas brazed heat exchangers such as EN-AW 3003. The reason is that a dense quantity of dispersoids is formed during annealing, see FIG. 2, which together with the low deformation degree during rolling allowed the core material to partly retain a deformed structure.

Figure 3:
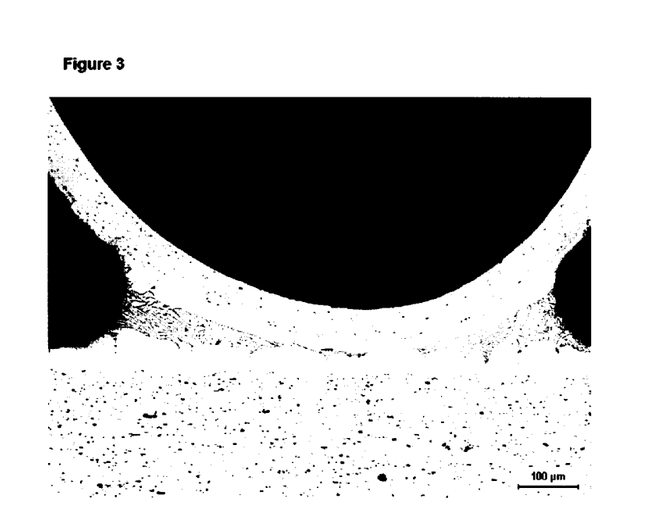
FIG. 3 shows the microstructure in a section through a seam formed when the sandwich material of the invention with core alloy 1 and 10% of the thickness of barrier layer 2 on each side is formed into a so-called fin and brazed to a tube of a sandwich material consisting of an Al—Mn-alloy with an intermediate layer of pure aluminium and a braze layer of an aluminium alloy with 10% Si. The sandwich material was rolled with a reduction corresponding to 16% of the starting thickness between intermediate annealing and brazing.

The sandwich material was brazed in inert gas after fluxing against a 0.40 mm thick, braze-plated tube. The brazed seams between the sandwich material and the tube exhibited good filling if the degree of reduction during the rolling before the brazing was at least 8%. An example of a brazed seam is given in FIG. 3.

Example 2

Figure 5:
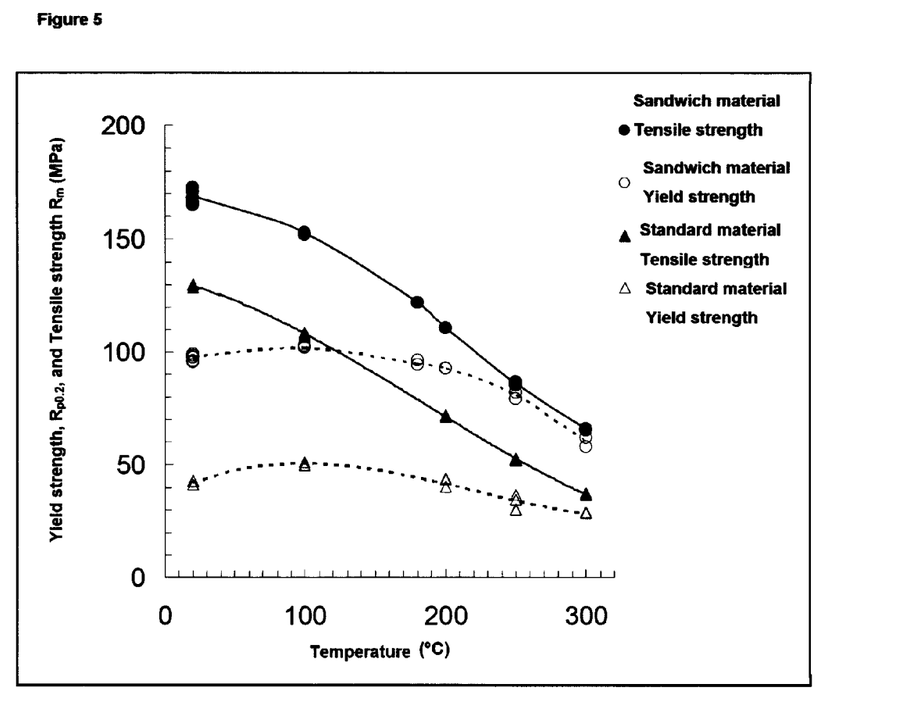
FIG. 5 shows a comparison of the strength variation with temperature for a sandwich material per Example 2 versus the strength of a standard alloy for fins.
Figure 6:
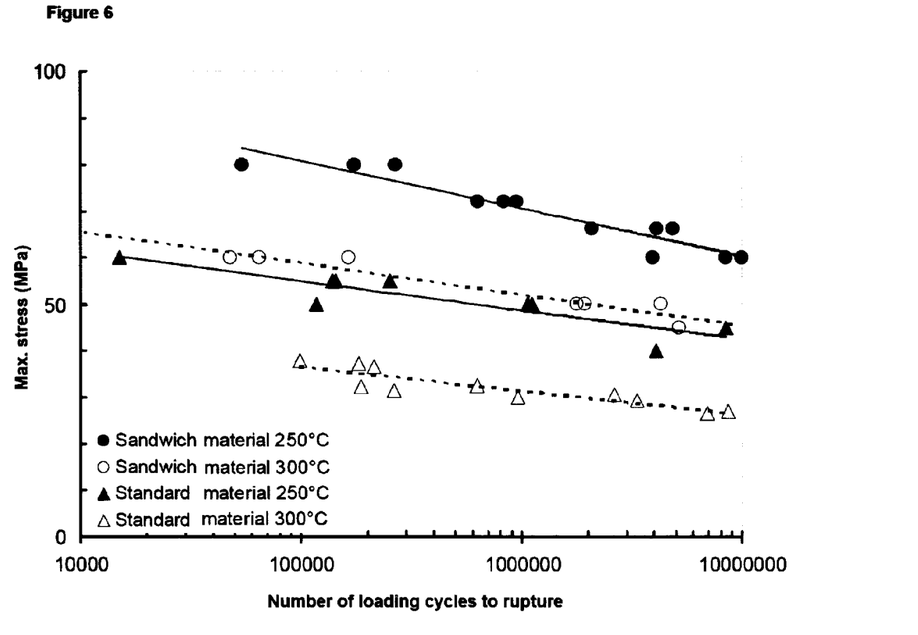
FIG. 6 shows a comparison of the fatigue strength variation with temperature for a sandwich material of the invention per Example 2 versus the corresponding property for a standard alloy for fins.
Figure 7:
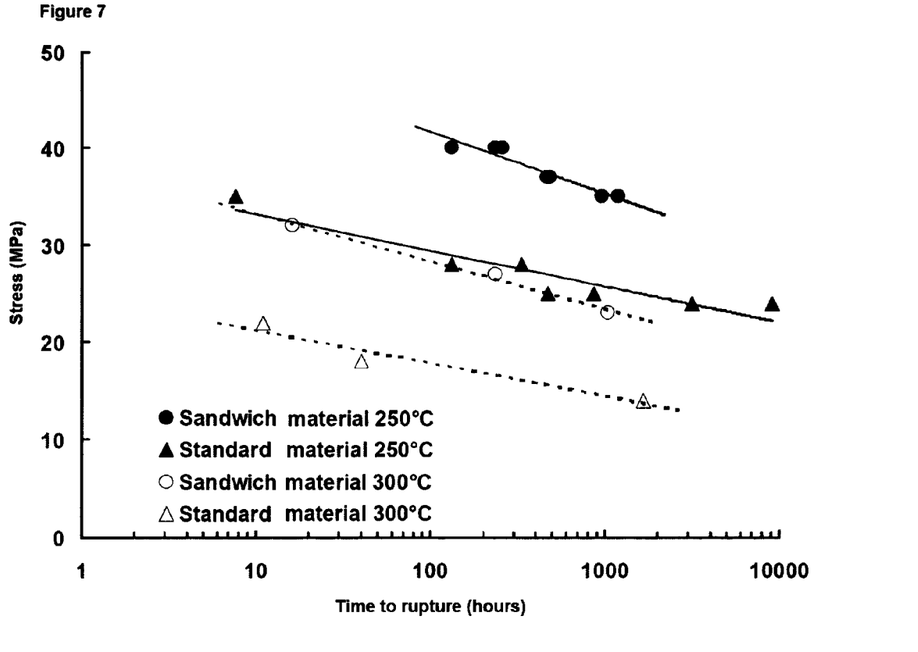
FIG. 7 shows a comparison of the creep strength variation with temperature for a sandwich material of the invention per Example 2 versus the corresponding property for a standard alloy for fins.

A sandwich material according to the invention was subjected to a braze-simulating heat treatment equal to that in Example 1. Table 3 shows the alloy composition after heat treatment. This is compared to a standard material, EN-AW 3003, for fins in automobile radiators. The standard material had been subjected to the same braze-simulating heat treatment as the sandwich material and its composition is also shown in Table 3. FIG. 5 shows the static strength variation with test temperature. FIGS. 6 and 7 illustrate fatigue and creep strength, respectively, at different temperatures. The figures show that the sandwich material has superior properties as compared to the standard material at room temperature and elevated temperature in terms of static strength, such as fatigue and creep.

TABLE 3

Alloy composition after braze-simulating heat treatment, wt. %.

|  | Si | Fe | Cu | Mn | Mg | Zr | Ti | Other elements, of each |
|---|---|---|---|---|---|---|---|---|
| Sandwich material |  |  |  |  |  |  |  |  |
| Core layer | 0.5 | 0.3 | <0.02 | 1.6 | 0.2 | 0.1 | 0.04 | <0.02 |
| Barrier layer | 0.1 | 0.3 | <0.02 | <0.02 | 0.2 | <0.02 | 0.1 | <0.02 |
| Standard material EN-AW 3003 | 0.1 | 0.5 | 0.1 | 1.2 | <0.02 | <0.02 | <0.02 | <0.02 |

Example 3

Deformation resistance was measured for several different alloys according to Table 4. Specimens were taken from ingots of the alloys and heat treated at 500° C. for 8 hours.

Deformation resistance was measured as the maximum force per unit of cross section area needed to deform cylinders of 21 mm height and 14 mm diameter. Circular grooves 0.2 mm deep and 0.75 mm wide had been cut out at each end of the cylinders at a distance of 2 mm from each other. The cylinders were heated to the test temperature and deformed at a deformation rate of 2 s$^{-1}$ to at least 50% height reduction. Boron nitride was used as lubricant.

The results for deformation at 480° C. are shown in Table 4.

TABLE 4

Deformation resistance at 480°° C.

| Alloy | Deformation resistance at 480°° C. (MPa) |
|---|---|
| Al—0.2% Fe—0.1% Si | 25 |
| Al—0.2% Fe—4% Si | 32 |
| Al—0.2% Fe—1.5% Mn—0.07% Si | 40 |
| Al—0.2% Fe—1.5% Mn—0.8% Si | 70 |

As shown by table 4, the deformation resistance for the alloy Al-0.2% Fe-0.1% Si is only 36% of the deformation resistance for the alloy Al-0.2% Fe-1.5% Mn-0.8% Si. By raising the silicon content to 4% in the first mentioned alloy and reducing the silicon content to 0.07% in the second alloy, the ratio in deformation resistance is increased to 80%, which should significantly facilitate adhesion and improve the yield during rolling at 480° C. Thus, by heat treatment at high temperature of a sandwich material according to the invention with a core layer of Al-0.2% Fe-1.5% Mn-0.07% Si and a barrier layer of Al-0.2% Fe-4% Si, silicon can be made to diffuse from the barrier layer to the core layer, so that the alloy in the core will become similar to Al-0.2% Fe-1.5% Mn-0.8% Si and the alloy in the barrier layer will become similar to Al-0.2% Fe-0.8% Si, which should give the desired properties in terms of inhibiting recrystallisation in the core layer, and a barrier layer effect and good corrosion hardness in the barrier layer.

The invention claimed is:

1. A method for making a sandwich material for brazing, the method comprising:
   providing a core layer of a first aluminum alloy comprising by wt %:
   Mn: 0.5-2.0%,
   Mg: ≤1.0%,
   Si: ≤0.2%,
   Ti: ≤0.3%,
   Cr: ≤0.3%,
   Zr: ≤0.3%,
   Cu: ≤0.2%,
   Zn: ≤3%,
   In: ≤0.2%,
   Sn: ≤0.1%,
   Fe+Ni: ≤0.7%,
   the rest Al and ≤0.05% of each of unavoidable impurities;
   providing a barrier layer of a second aluminum alloy comprising by wt %:
   Mn+Cr: ≤0.2%,
   Mg: ≤1.0%,
   Si: 1.6-5%,
   Ti: ≤0.3%,
   Zr: ≤0.2%,
   Cu: ≤0.2%,
   Zn: ≤3%,
   In: ≤0.2%,
   Sn: ≤0.1%,
   (Fe+Ni): ≤1.5%,
   the rest Al and ≤0.05% of each of unavoidable impurities;
   rolling the core layer and the barrier layer together so that they adhere and form a sandwich material;
   heat treating the sandwich material at a predetermined temperature for a predetermined time so that the Si-content is equalized to 0.4-1% in both the core layer and the barrier layer; and
   rolling the sandwich material to the intended final thickness.

2. The method according to claim 1, wherein the sandwich material, before heat treatment, is also cold rolled until the sandwich material is 8% to 33% thicker than the intended final thickness.

3. The method according to according to claim 1, wherein the sandwich material after heat treatment is cold rolled to final thickness with a reduction degree of 8% to 33%, of the intended final thickness.

4. The method according to claim 1, wherein the heat treatment is done at a temperature between 350° C. and 550° C.

5. The method according to claim 1, wherein the heat treatment is done for a time of 1-24 hours.

6. The method according to claim 1, further comprising:
   providing a core layer of the first aluminum alloy and two barrier layers of the second aluminum alloy, wherein the barrier layer is arranged on either side of the core material.

7. The method according to claim 6, wherein the barrier layer or layers constitute an outermost layer of the sandwich material on the side of the sandwich material that is to be brazed to another part.

8. The method according to claim 6, wherein $0.4\% \leq Cs*x/100 + Ck*(100-x)/100 \leq 1.0\%$, where Ck is the silicon content in the core layer before the rolling, and Cs is the silicon content in the barrier layer before rolling, and x is the thickness of the barrier layer, or in the case of two barrier layers the combined thickness of the barrier layers, in % of the total thickness of the sandwich material after being rolled together.

9. The method according to claim 8, wherein x is 7 μm or more.

10. A process for making a brazed product, the process comprising, a method for making a sandwich material comprising
    providing a core layer of a first aluminum alloy comprising by wt %:
    Mn: 0.5-2.0%,
    Mg: ≤1.0%,
    Si: ≤0.2%,
    Ti: ≤0.3%,
    Cr: ≤0.3%,
    Zr: ≤0.3%,
    Cu: ≤0.2%,
    Zn: ≤3%,
    In: ≤0.2%,
    Sn: ≤0.1%,
    Fe+Ni: ≤0.7%,
    the rest Al and ≤0.05% of each of unavoidable impurities,
    providing a barrier layer of a second aluminum alloy comprising by wt %:
    Mn+Cr: ≤0.2%,
    Mg: ≤1.0%,
    Si: 1.6-5%,
    Ti: ≤0.3%,
    Zr: ≤0.2%,
    Cu: ≤0.2%,
    Zn: ≤3%,
    In: ≤0.2%,
    Sn: ≤0.1%,
    (Fe+Ni): ≤1.5%,
    the rest Al and ≤0.05% of each of unavoidable impurities,
    rolling the core layer and the barrier layer together so that they adhere and form a sandwich material,
    heat treating the sandwich material at a predetermined temperature for a predetermined time so that the Si-content is equalized to 0.4-1% in both the core layer and the barrier layer, and
    rolling the sandwich material to the designed final thickness, and brazing of this sandwich material to another part.

11. The process according to claim 10, wherein the barrier layer is allowed to recrystallize during the brazing so that the barrier layer has a grain size having a length parallel to the rolling surface of the sandwich material that is at least 50 μm.

12. The process according to claim 10, wherein the core layer of the sandwich material has a non-recrystallized or partly recrystallized structure after brazing.

13. The process according to claim 10, wherein the sandwich material after brazing has a yield strength which is at least 60 MPa at room temperature.

14. The process according to claim 10, wherein the sandwich material after brazing has a fatigue strength higher than 35 MPa for one million loading cycles with a tensile load of R=0.1 at 300° C.

* * * * *